United States Patent
Ueno et al.

[19]

[11] Patent Number: 6,157,434
[45] Date of Patent: Dec. 5, 2000

[54] MOVIE FILM HAVING TWO DIGITAL AUDIO DATA RECORDING AREAS ALONG ITS LONGITUDINAL DIRECTION

[75] Inventors: Masatoshi Ueno; Shinji Miyamori, both of Tokyo, Japan

[73] Assignee: Sony Corporation, Tokyo, Japan

[21] Appl. No.: 08/165,318

[22] Filed: Dec. 13, 1993

[30] Foreign Application Priority Data

Dec. 28, 1992 [JP] Japan ................................... 4-362167

[51] Int. Cl.⁷ .................................................. G03B 31/02
[52] U.S. Cl. ................................................ 352/27; 352/37
[58] Field of Search .................................... 352/1, 5, 11, 8, 352/26, 27, 29, 30, 37, 239, 236; 369/124, 125; 360/3, 32, 48

[56] References Cited

U.S. PATENT DOCUMENTS

| | | | |
|---|---|---|---|
| 4,202,018 | 5/1980 | Stockham, Jr. ........................ | 360/47 |
| 4,256,389 | 3/1981 | Engebretson .......................... | 352/11 |
| 5,115,240 | 5/1992 | Fujiwara et al. ...................... | 341/51 |
| 5,155,510 | 10/1992 | Beard ................................... | 352/27 |
| 5,194,996 | 3/1993 | Shores .................................. | 360/48 |
| 5,323,193 | 6/1994 | Weisman .............................. | 352/221 |
| 5,327,182 | 7/1994 | Kohut et al. .......................... | 352/27 |
| 5,386,256 | 1/1995 | Taylor et al. ......................... | 352/27 |

FOREIGN PATENT DOCUMENTS

| | | |
|---|---|---|
| 544090A1 | 2/1993 | European Pat. Off. . |
| WO 92/06409 | 4/1992 | WIPO . |

*Primary Examiner*—Eddie C. Lee
*Attorney, Agent, or Firm*—Frommer Lawrence & Haug, LLP.; William S. Frommer; Dennis M. Smid

[57] ABSTRACT

The movie film has two tracks of left and right digital audio data recording areas in addition to a frame image information recording area in the form of frames, an analog audio data recording area, and left and right perforations. In these audio data recording areas, the same encoded audio data is recorded. Preferably, the audio data is constituted, using the encoding system called the ATRAC system, by the encoding parameter data, the encoded audio data, and the same parameter as the encoding parameter doubly written. This doubly written parameter is recorded in a manner so that when for example the encoding parameter and the encoded audio data are recorded on the left side audio data recording area for a certain channel, the tracks are switched so that the recording is carried out on the opposite right side audio data recording area.

4 Claims, 8 Drawing Sheets

| |
|---|
| BLOCK SIZE MODE |
| SUB INFORMATION AMOUNT |
| WORD LENGTH DATA |
| SCALE FACTOR DATA |
| SPECTRUM DATA |
| REDUNDANT SCALE FACTOR BYTE |
| REDUNDANT WORD LENGTH BYTE |
| SUB INFORMATION AMOUNT |
| BLOCK SIZE MODE |

FIG. 6

| |
|---|
| SECTOR ID (20 BYTES) |
| DATA 0 (212 BYTES) |
| DATA 1 (212 BYTES) |
| DATA 2 (212 BYTES) |
| DATA 3 (212 BYTES) |
| DATA 4 (212 BYTES) |
| DATA 5 (212 BYTES) |
| DATA 6 (212 BYTES) |
| DATA 7 (212 BYTES) |
| CRC (4 BYTES) |

MOVIE FILM HAVING TWO DIGITAL AUDIO DATA RECORDING AREAS ALONG ITS LONGITUDINAL DIRECTION

BACKGROUND OF THE INVENTION

1. Field of the Invention

The present invention relates to a movie film (or a projection film or a motion picture), more particularly relates to a movie film recording digital audio data.

2. Description of the Related Art

In a movie film, a plurality of video recording portions are arranged in a longitudinal direction in the form of frames. Audio data related to the video images recorded in the corresponding video recording portions is recorded in an analog format along these video recording portions.

To achieve an improvement of the audio reproduction, contrary to this, a method of recording the audio data in a digital format has been proposed.

The conventional method of recording audio data in a digital format suffers from the disadvantage of a pour encoding and recording efficiency and data loss due to scratches on the movie film or the like.

SUMMARY OF THE INVENTION

An object of the present invention is to provide a movie film in which the reproduction ability of audio data is not lost in practice even in the event of scratches on the movie film, the efficiency of encoding is high, and the audio reproduction data is recorded in a digital format.

Another object of the present is to enable the reproduction of an audio having a high quality with a small number of bits (or bytes) effective for a movie film restricted in space.

Still another object of the present invention is to provide an audio signal having a high reliability and good reproduction quality without requiring a great modification in the already existing apparatus.

To achieve the above-mentioned objects, the movie film of the present invention is characterized in that it includes a frame image information recording area (portion) arranged along a longitudinal direction in the form of frames and at least two digital audio data recording areas arranged at different positions in a direction orthogonal to the longitudinal direction and in that the audio reproduction data is recorded in a digital format with a predetermined relationship in at least two digital audio data recording areas.

In the movie film of the present invention, the same audio reproduction data is preferably doubly recorded on at least two digital audio data recording areas with a predetermined relationship, and therefore even in a case where a scratch or the like is formed on one digital audio data recording area and reproduction cannot be performed there, the reproduction can be carried out using the other audio reproduction data, so the reliability of the reproduction of the audio data is high.

Specifically, the audio reproduction data recorded in the digital audio data recording areas is constituted by a plurality of channels. Each channel has a parameter by which the audio reproduction data is encoded, the encoded data, and a doubly written parameter the same as the parameter or the same as a part of the parameter.

Preferably, the doubly written encoding parameter is recorded in a digital audio data recording area which is different from the digital audio data recording area in which the encoding parameter and the encoded data are recorded.

In the method for recording the doubly written encoding parameter, a preferable relationship exists depending on the number of channels.

When the number of the channels is an even number, the doubly written encoding parameter is recorded at the recording position of another digital audio data recording area corresponding to the recording position of the digital audio data recording area in which the encoding parameter and the encoded data are recorded.

Also, when the number of the channels is an odd number, the doubly written encoding parameter is recorded in another digital audio data recording area in units of two cycles.

Preferably, the encoding of the audio reproduction data is carried out based on an encoding system called the ATRAC system (adaptive transform acoustic coding encoding system developed by Sony Corporation) wherein that data is broken down on a two-dimensional region of time and frequency, what types of components that audio data is constituted by is analyzed; with what degree of precision these components should be encoded is determined to determine the encoding parameter; and the components of the respective audio data are normalized and requantized for each two-dimensional sub-region of time and frequency on the basis of the encoding parameter to produce the encoded data.

If the doubly written encoding parameter is recorded in a digital audio data recording area which is different from another digital audio data recording area in which the encoding parameter and the encoded data are recorded, in particular, it becomes possible to prevent decoding (reproduction) error of the compressed data due to encoding in the event of scratches peculiar to the movie film.

As the method of recording of the doubly written encoding parameter, a preferable method is adopted in accordance with whether the number of the channels is even or odd as mentioned above.

BRIEF DESCRIPTION OF THE DRAWINGS

The above objects and features and other objects and features of the present invention will clear from the following detailed description made with reference to the accompanying drawings, in which:

FIG. 5 is a view showing the configuration of a sound frame recorded in the digital audio data recording portion of the movie film of the present invention based on the encoding system shown in FIG. 4;

FIG. 6 is a view showing a format recorded in the digital audio data recording portion of the movie film of the present invention with the configuration of the sound frame shown in FIG. 5;

DESCRIPTION OF THE PREFERRED EMBODIMENTS

Figure 1:
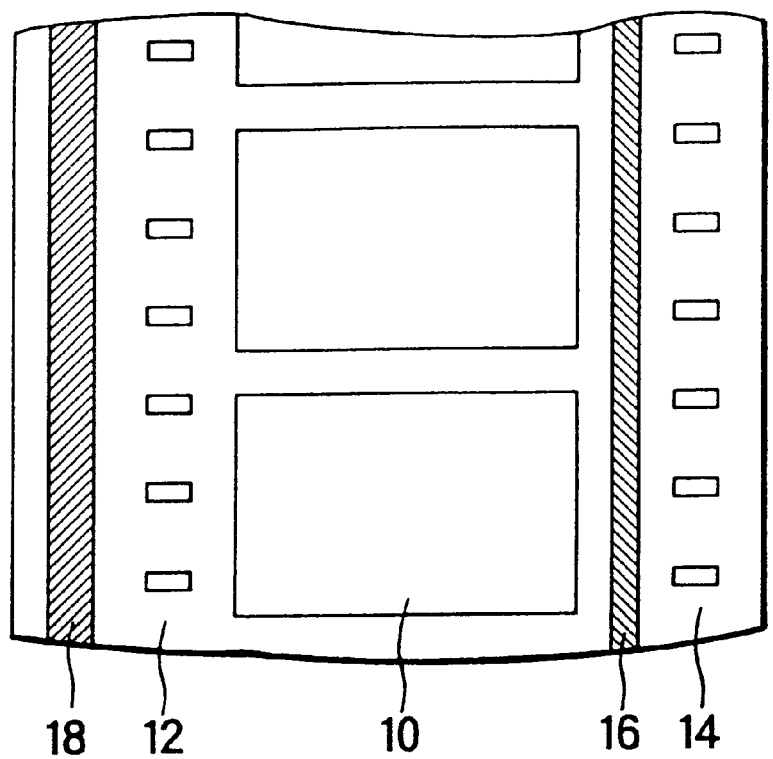
FIG. 1 is a partial plan view of a movie film of a first embodiment of the present invention.

FIG. 1 is a partial plan view of a movie film of a first embodiment of the present invention.

This movie film 1 has a plurality of video recording portions 10 provided in the form of frames along a longitudinal (advancing) direction of the movie film 1; an analog and audio data recording portion 16 provided beside these video recording portions 10; a left side perforation 12 which is provided on the outside of the video recording portions 10 and the analog and audio data recording portion 16 and feeds the movie film 1; and a right side perforation 14. The structure of the above-mentioned movie film 1 is that of a movie film transmitting a usual analog audio signal.

The movie film 1 is further provided with a digital audio data recording portion 18 beside the left side perforation 12.

In this way, the movie film 1 in which the analog and audio data recording portion 16 and the digital audio data recording portion 18 are provided can be used in both a projector having an analog type audio reproduction device and a projector having a digital type audio reproduction device.

Note that, in the present invention, the audio (sound) reproduction data means a broad range of sound information recognized by the auditory sense and including voice and other sounds.

Figure 2:
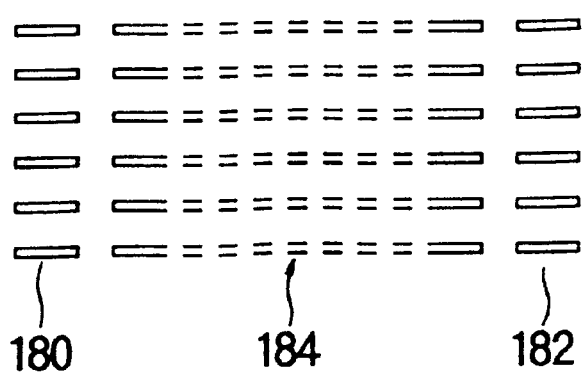
FIG. 2 is an enlarged view of a digital audio data recording portion of the movie film shown in FIG. 1.

FIG. 2 is an enlarged partial view of the digital audio data recording portion 18.

The digital audio data recording portion 18 is provided with a digital audio data recording portion 184 at the center. A left side tracking bar 180 and a right side tracking bar 182 are provided on the two sides of this digital audio data recording portion 184 so that correct positioning or position detection for reproducing (decoding) the audio data recorded on the digital audio data recording portion 184 is carried out.

The left side tracking bar 180 and the right side tracking bar 182 are not directly related with the gist of the present invention, and therefore a detailed explanation thereof will be omitted.

Figure 3:
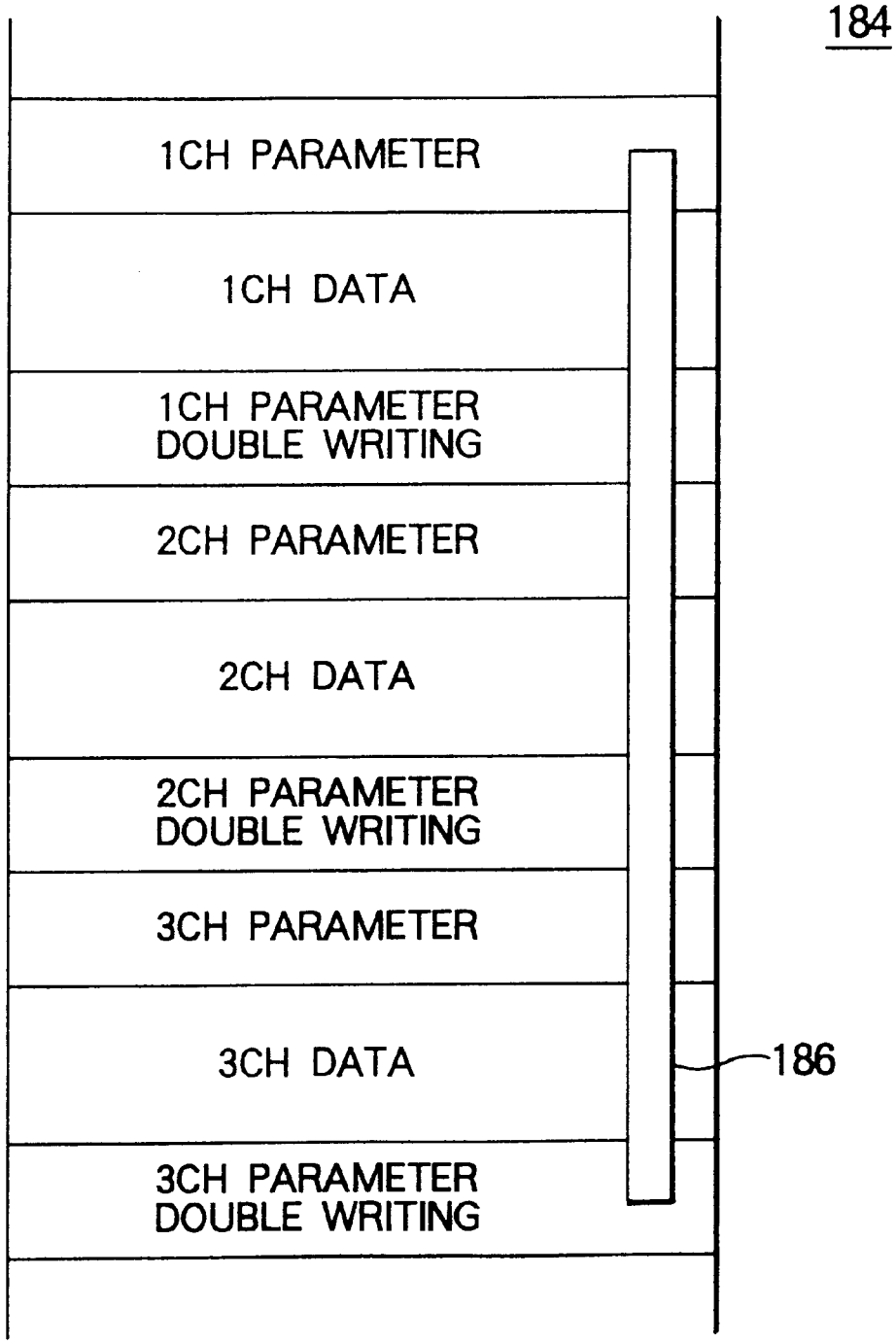
FIG. 3 is a view showing a recording format of the digital audio data recording portion shown in FIG. 2.

FIG. 3 is a view of the format of the audio reproduction data recorded on the digital audio data recording portion 184 shown in FIG. 2.

On the digital audio data recording portion 184, based on the SDDS (Sony Dynamic Digital Sound) recording system, 8 channels of the digital audio data are provided for one unit of the audio data. Each channel comprises an encoding parameter recording portion, an encoded and compressed audio data recording portion, and an encoding parameter double writing recording portion which doubly writes the encoding parameter the same as the above-described encoding parameter or a part thereof. The encoding parameter double writing recording portion is a part for doubly writing the same encoding parameter or a part thereof, for enabling recovery when trouble occurs with the encoding parameter recorded on the encoding parameter recording portion. In this way, the reliability is improved with respect to the loss of the storage of the encoding parameter.

Details of these will be given later.

As mentioned above, in the SDDS recording system, the digital audio data is standardized to 8 channel data. However, it is difficult to ensure a region for recording 8 channels of audio data consisting of 16 bits at 44.1 kHz on the movie film 1 as they are. Also, the medium of a movie film 1 is often repeatedly used for reproduction in contact with other elements, and therefore it is difficult to avoid the occurrence of scratches etc. on the surface thereof. That is, if the digital audio data is recorded as the original data as is, there is a tremendous loss of the data, and thus the film is not suitable for practical use. Accordingly, the error correction code ability becomes very important, and compression of the audio reproduction data to an extent to which the recording region of that correction code can be sufficiently ensured becomes necessary.

Therefore, the digital audio data compression technique called the ATRAC (adaptive transform acoustic coding) system used in the Minidisk device is used for the compression of the digital audio data recorded on the digital audio data recording portion 184 in the SDDS recording system.

Figure 4:
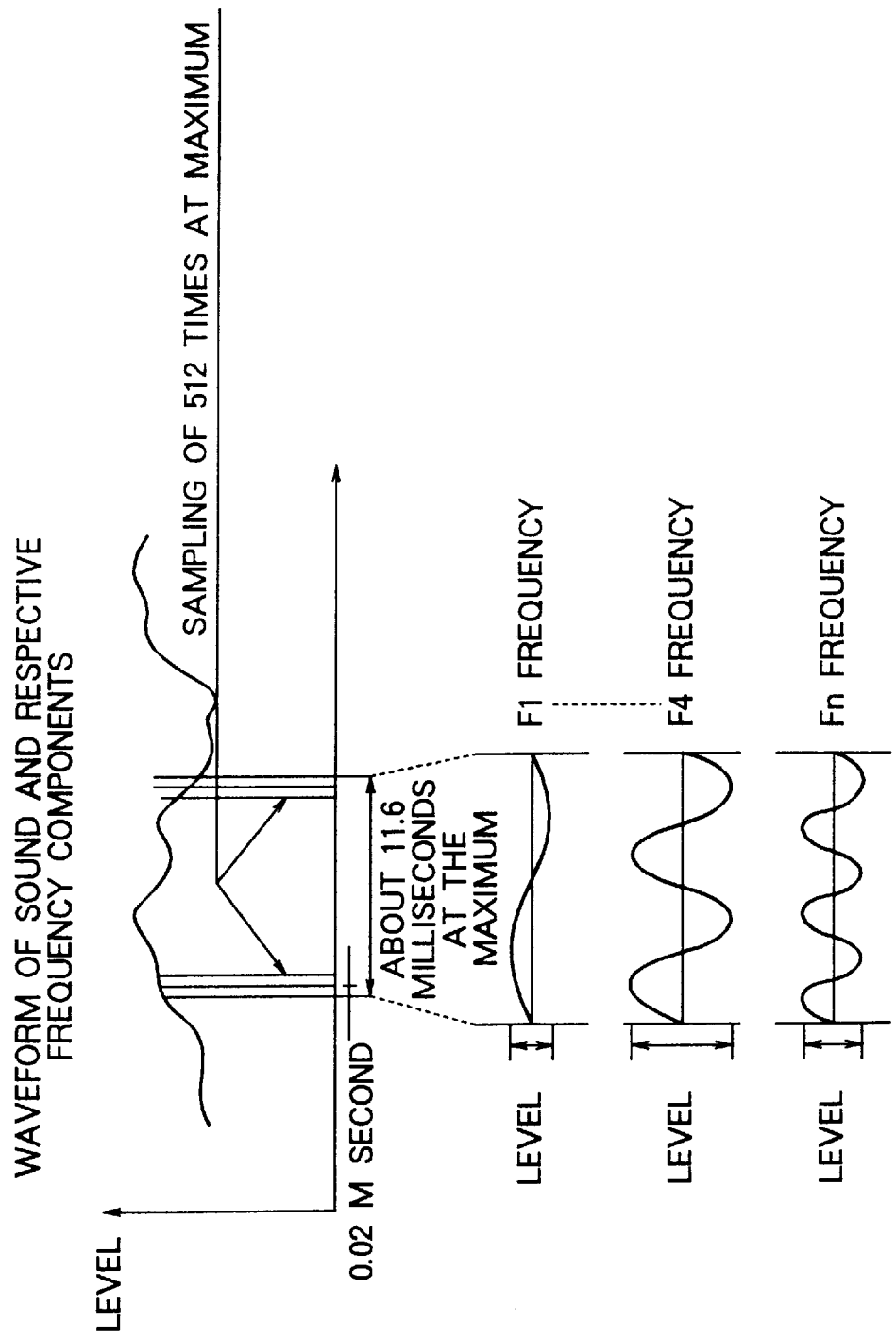
FIG. 4 is a view showing the encoding system of data recorded in the digital audio data recording portion of the movie film of the present invention.

FIG. 4 is a view illustrating the principle of the ATRAC system.

The A/D-converted digital audio data is picked out with time windows of 11.6 ms at the maximum and broken down into frequency components by an MDCT (modified discrete cosine transform) computation. In this example, the frequency band is divided into three bands. The reasons why the frequency band is divided are for an improvement of the performance and for reduction of the price.

Describing first about the performance, this is done for enhancing the time response characteristic in the respective frequency bands. When the audio signal is in a steady state, to ensure a high precision frequency resolution, a long block (11.6 ms) is used, and the effective transmission of the signal components and the quantization noise are controlled. While the audio signal abruptly changes, the time resolution is raised up to 2.9 ms at 11 kHz or less and up to 1.45 ms at more than 11 kHz in parts.

In regard to the price, the size of the hardware is reduced since the memory capacity necessary for the MDCT computation can be reduced and by selectively emphasizing the bands up to the intermediate band where the human auditory sense is high.

That is, the ATRACT system performs compression of the audio data by encoding the digital audio data utilizing the nature of the human auditory sense. More concretely, first, the audio data to be compressed is broken down into signal components on a two-dimensional region of time and frequency, then what types of components that audio signal is constituted by is analyzed to find with what degree of precision the respective components are to be encoded, and then the parameters are formed. Finally, based on these encoding parameters, the audio signal components are normalized and requantized (block floated) for every two-dimensional sub-region of time and frequency to obtain an encoded audio data.

As a result, the audio data of the ATRAC system is recorded in units called sound frames.

FIG. 5 is a view showing the state of recording of the data inside a sound frame.

One sound frame consists of 212 bytes. Here, audio reproduction data corresponding to 512 samples, i.e., one channel with a sampling rate of 44.1 kHz is recorded.

The 212 bytes of sound frame data are comprised of a block size mode, a sub-information amount, a word length data, scale factor data, spectrum data, a redundant scale factor byte, a redundant word length byte, a lower sub-information amount, and a lower block size mode. That is, the 212 bytes of data include a doubly written part for the error correction, the redundant scale factor byte, redundant word length byte, and the lower block size mode. Further, information defining the amount of this double writing and the lower sub-information amount are included in the 212 bytes. The amount occupied by the double writing can be changed for each sound frame. In this example, among the 212 bytes, 186 bytes are used for parts other than the double writing.

The digital audio data recorded in the digital audio data recording portion 184 inside the digital audio data recording portion 18 of the movie film 1 is constituted based on this ATRAC system.

FIG. 6 is a view showing the format thereof.

This format data is composed of a sector ID of 20 bytes, DATA0 to DATA7 each consisting of 212 bytes, and 4 bytes of CRC. More precisely, an error correction code (ECC) is added to the data of this format.

A "sector" means a unit of data to which the CRC and sector ID are added for each 8 sound frames.

The above related to the recording image of the digital audio data recording portion 184 shown in FIG. 3.

In this way, the encoded and compressed digital audio data is divided into an encoding parameter region and encoded data region. The information used for compression is recorded in the encoding parameter region, and therefore when this region is destroyed, the encoded data in that region becomes completely meaningless. Therefore, in the ATRAC system, the most important encoding parameters are doubly written.

In this way, in the movie film 1, according to the recording system of the MD, audio data having a high reliability even with respect to scratches etc. is recorded in a digital format with a high encoding efficiency.

Accordingly, when this digital audio data is reproduced, sound having a high quality corresponding to that of the MD can be reproduced.

In the movie film 1 of the above-described first embodiment, there are points which should be improved on from the viewpoint of the reliability.

Even though the parameters are doubly written in the same region as in the movie film 1, this is not sufficient in terms of the reliability. The reason for this is that the direction of advance of the movie film 1 is the longitudinal (vertical) direction and the contact surface (sprocket), which is not an object of reading, passes from the top toward the bottom in FIG. 3 at the time of reading of the audio data from the relationship of the position for recording the audio data in the movie film 1. At this time, there is a high probability of occurrence of a linear scratch as indicated by the scratch 186. As a result, the encoding parameter double writing portion written on the same region is destroyed, and there sometimes occurs a case where the meaning of the double writing is lost.

A second embodiment of the movie film of the present invention solves the problem in the first embodiment mentioned above.

Figure 7:
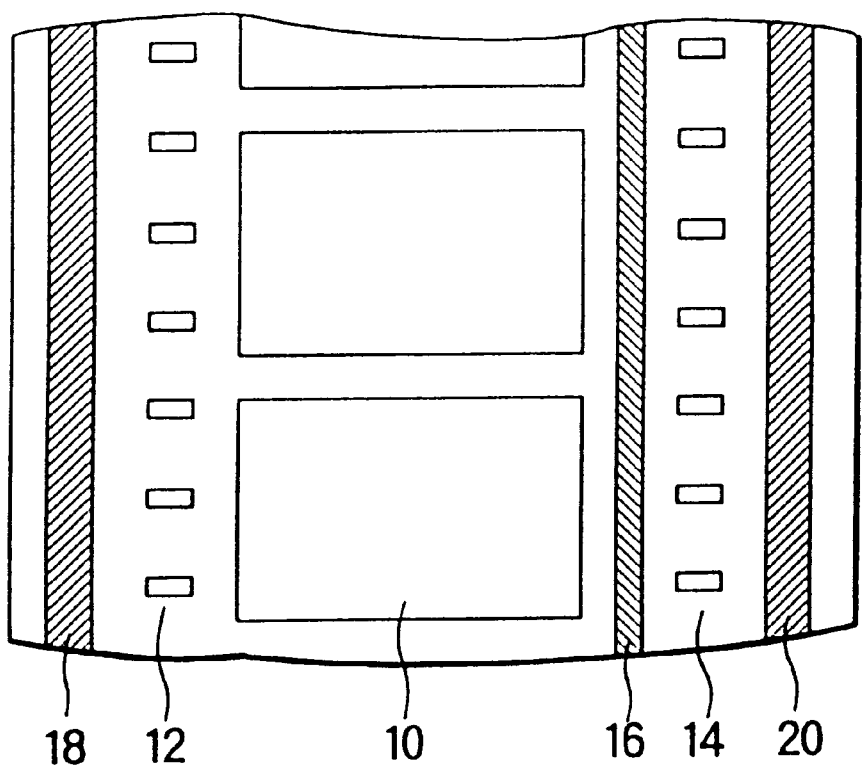
FIG. 7 is a partial plan view of the movie film of a second embodiment of the present invention.

FIG. 7 is a partial plan view of the movie film 1A of a second embodiment of the movie film of the present invention.

This movie film 1A has, in the same way as the movie film 1 shown in FIG. 3, a right side digital audio data recording portion 20 at the position opposite to the left side digital audio data recording portion 18 in addition to the video recording portions 10, a left side perforation 12, a right side perforation 14, an analog audio data recording portion 16, and a digital audio data recording portion 18 (left side digital audio data recording portion 18).

This example indicates a case wherein the left side digital audio data recording portion 18 and the right side digital audio data recording portion 20 are arranged on the outside of the left side perforation 12 and the right side perforation 14.

It is sufficient if the left side digital audio data recording portion 18 and the right side digital audio data recording portion 20 are arranged at positions at which they are resistant to the effects of a scratch, but by arranging the left side digital audio data recording portion 18 and right side digital audio data recording portion 20 as shown in FIG. 7, since the positional relationship among the left side perforation 12, video recording portions 10, analog audio data recording portion 16, and the right side perforation 14 is not changed, in a projector using the analog audio data recording portion 16, the analog audio data recording portion 16 can be used as it is.

On the left side digital audio data recording portion 18 and the right side digital audio data recording portion 20, the digital audio data mentioned referring to FIG. 3 to FIG. 6 is recorded. Substantially the same Code data is recorded as the digital audio data recorded on the left side digital audio data recording portion 18 and the digital audio data recorded on the right side digital audio data recording portion 20.

In this way, the digital audio data is recorded divided at different positions which face each other in the longitudinal direction of the movie film 1A with redundancy, whereby even if a scratch such as the scratch 186 shown in FIG. 3 is caused on for example the left side digital audio data recording portion 18 side, the digital audio data recorded on the right side digital audio data recording portion 20 can be used without problem.

A preferable example of the recording method of the digital audio data having redundancy will be explained below.

Figure 8:
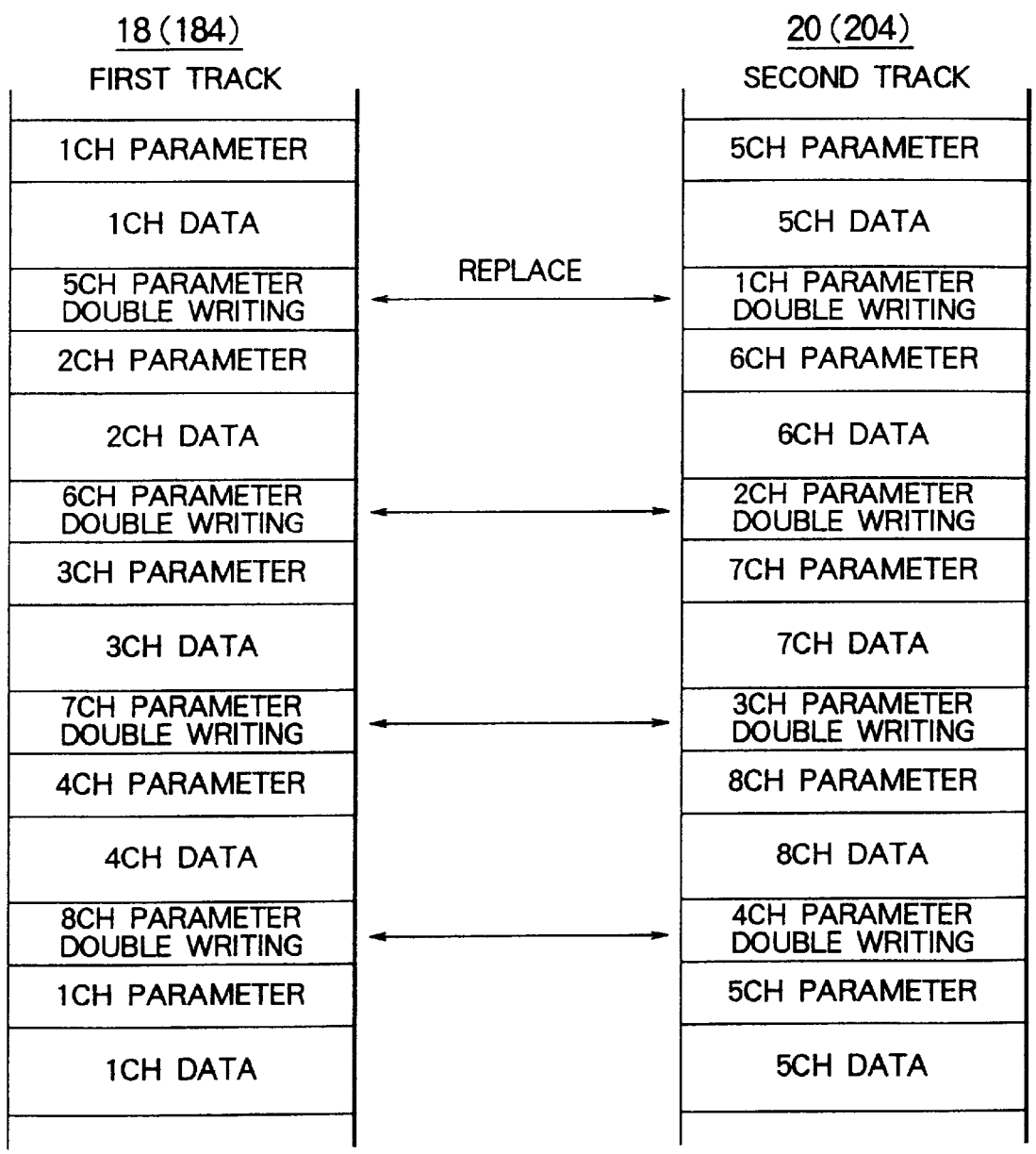
FIG. 8 is a view of a first mode of a data recording format for performing recording on the two tracks of a digital audio data recording portion in the movie film shown in FIG. 7.
Figure 9:
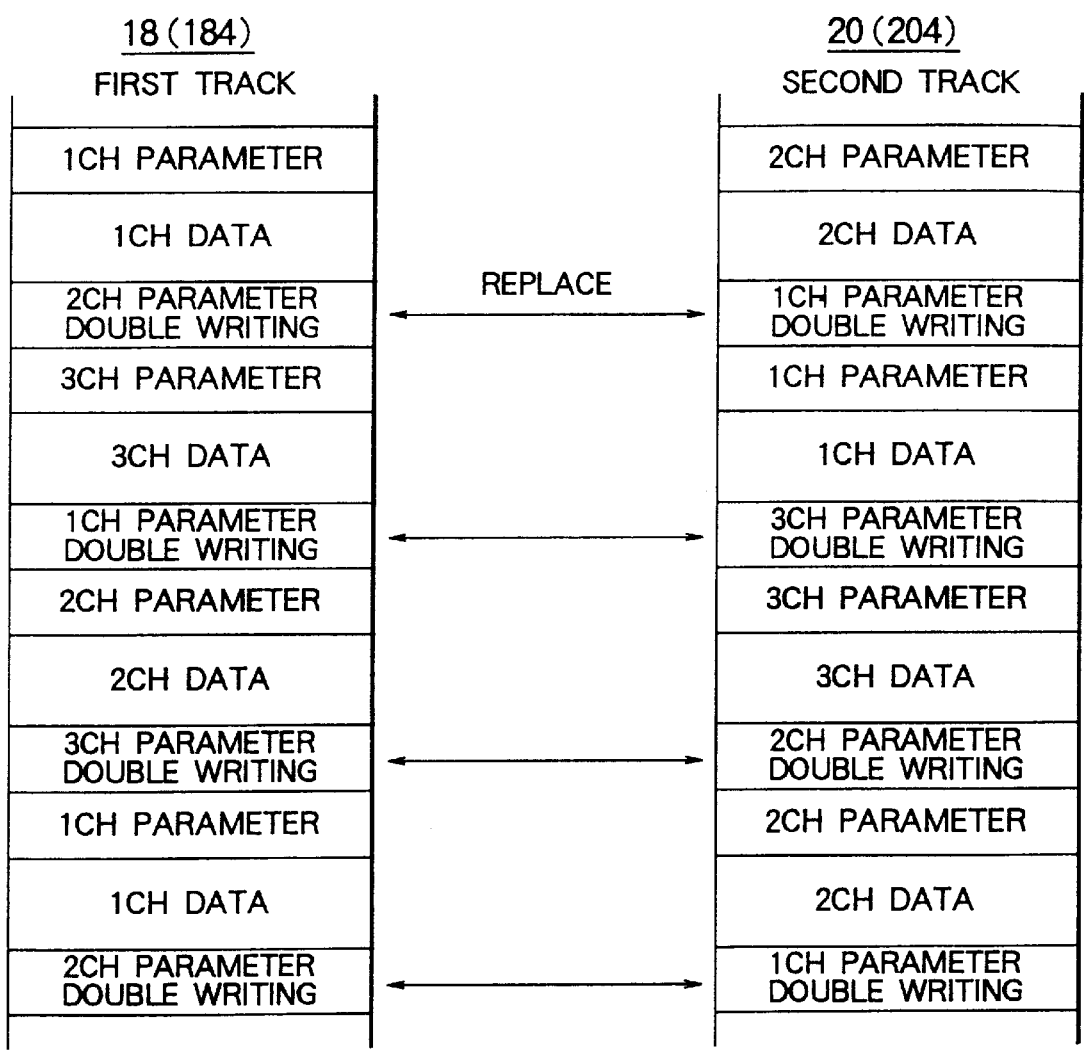
FIG. 9 is a view of a second mode of a data recording format for performing recording on the two tracks of a digital audio data recording portion in the movie film shown in FIG. 7.

FIG. 8 shows a method of recording where the number of channels is even, and FIG. 9 shows a method of recording where the number of the channels is odd.

FIG. 8 and FIG. 9 show the configuration of the digital audio data recorded on the digital audio data recording portion 184 inside the left side digital audio data recording portion 18 and the digital audio data recorded on the digital audio data recording portion 204 corresponding to the digital audio data recording portion 184 inside the right side digital audio data recording portion 20.

The audio data compressed by the above-mentioned ATRAC system is written in three regions of the encoding parameter region, the encoded data region, and the encoding parameter double writing region.

The size of the encoding parameter region and encoded data region differs depending upon the value of the encoding parameter, but the total size of these two regions and the size of the encoding parameter double writing region are constant.

Accordingly, if the encoding parameter double writing region is ensured in regions which are not simultaneously destroyed, it becomes possible to suppress the occurrence of decoding (reproduction) error, and since the size is constant, the ensuring of that region is easy.

Therefore, as shown in FIG. 8, the contents written in the encoding parameter double writing regions existing at the same positions at two tracks are switched with each other.

By this, the following is performed so as to avoid problems.

(1) In the encoding stage, immediately before the encoding, the tracks are switched only in the encoding parameter double writing regions.

(2) At the decoding (reproduction) stage, immediately before the decoding, switching is performed only in the encoding parameter double writing regions.

By this, the occurrence of decoding error of data can be easily suppressed.

This divisional recording system is not restricted to a movie film and not restricted to the compression technique according to the ATRAC system, which is preferable when applied to a recording medium which vigorously deteriorates. It is a recording system effective when data compressed by using various types of audio signal compression techniques is recorded.

Particularly, where the ATRAC system is used, it is defined by the format that the encoding parameter double writing region have a size of 26 bytes at the present and a size of more than 2 bytes and less than 67 bytes in the future. Therefore, to suppress the occurrence of decoding error due to the compression of the data, the above-mentioned divisional recording system is necessary and effective.

In the current system, the audio data is standardized as 8 channels, but the above-mentioned method can be applied to any number of channels more than two.

Concretely, the encoding parameter double writing regions are switched as follows:

(a) Where the number of the channels is even, as mentioned referring to FIG. 8, the encoding parameter double writing regions are switched between the digital audio data recording portion 184 inside the left side digital audio data recording portion 18 and the digital audio data recording portion 204 inside the right side digital audio data recording portion 20 at the same track positions as those in the encoding parameter region and the encoded data region.

(b) Where the number of the channels is odd, as shown in FIG. 9, they are switched in units of 2 cycles as shown in FIG. 9.

In this way, encoding parameter double writing regions having a constant size are simply switched. No change of the format is necessary at all, therefore it does not depend upon the assigned number of channels of each area, and thus the handling is easy. Accordingly, also, no change of the decoding circuit is necessary, and the occurrence of decoding error can be suppressed merely by adding processing for switching the encoding parameter double writing regions. That is, the interruption of the audio when correction is impossible due to a long burst error peculiar to the movie film can be reduced.

The arrangement of the left side digital audio data recording portion 18 and the right side digital audio data recording portion 20 is not restricted to the arrangement shown in FIG. 7. Various types of arrangements which enable the restoration of a long burst error due to a scratch etc., which is peculiar to movie film, are possible.

Figure 10:
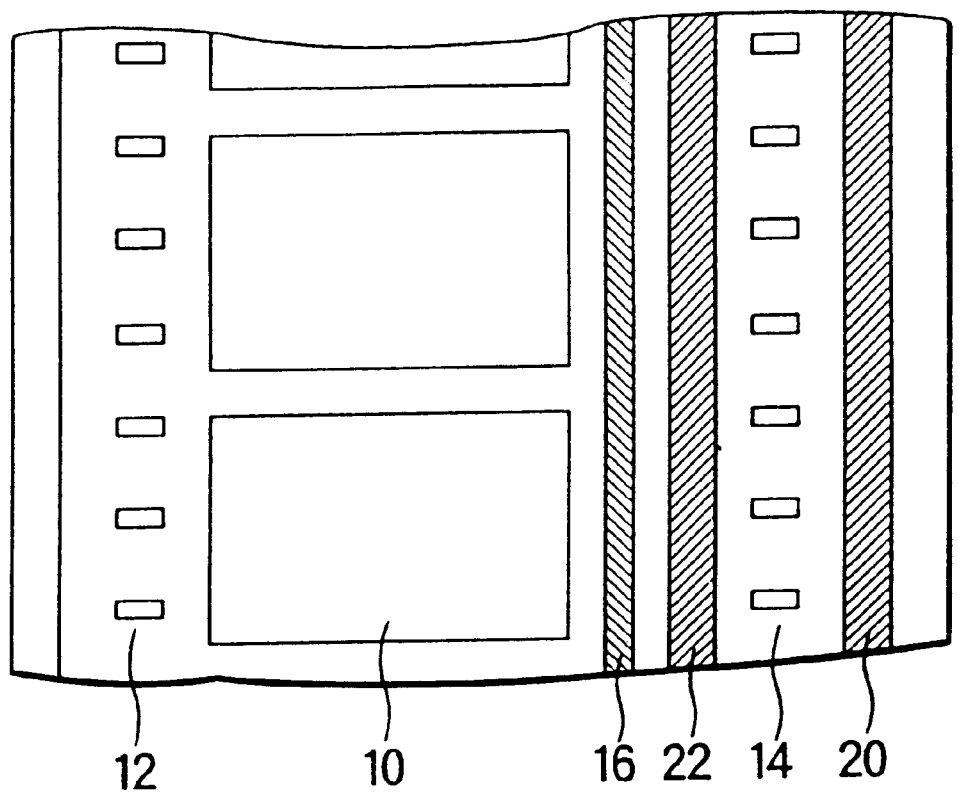
FIG. 10 is a partial plan view of the movie film of a third embodiment of the present invention.

For example, as illustrated in FIG. 10, for the movie film 1B, it is also possible to constitute the movie film by the left side perforation 12, the video recording portions 10, the analog audio data recording portion 16, the left side digital audio data recording portion 22, the right side perforation 14, and the right side digital audio data recording portion 20. That is, in this movie film 1B, in place of the left side digital audio data recording portion 18 shown in FIG. 7, the left side digital audio data recording portion 22 is provided between the analog audio data recording portion 16 and the right side perforation 14. The left side digital audio data recording portion 22 and the right side digital audio data recording portion 20 are arranged astride the right side perforation 14, and therefore are resistant to the effects of a scratch etc.

Similarly, it is also possible to modify the movie film 1 shown in FIG. 7 and arrange the left side digital audio data recording portion 18 between the left side perforation 12 and the video recording portions 10 and arrange the right side digital audio data recording portion 20 between the analog audio data recording portion 16 and the right side perforation 14. That is, from a part at the end portion of the movie film 1, which easily is scratched, the left side digital audio data recording portion 18 and the right side digital audio data recording portion 20 are provided inside the left side perforation 12 and the right side perforation 14.

As the digital audio data recording portion, as mentioned referring to FIG. 7 and FIG. 10, it is possible to provide not only a digital audio data recording portion having two tracks, but also provide a digital audio data recording portion having three or more tracks.

Also, as the movie film of the present invention, the analog audio data recording portion 16 shown in FIG. 7 and FIG. 10 is not always necessary.

While a preferred embodiment of the movie film of the present invention was explained above, as an easier method, in the movie film 1 shown in FIG. 7, it is also possible to record the same digital audio data at the same positions by the recording format the same as that shown in FIG. 3 in the left side digital audio data recording portion 18 and the right side digital audio data recording portion 20.

According to the preferred movie film of the present invention, the reproduction ability of the audio is not lost even in the event of a scratch in the movie film, and the efficiency of encoding is good.

Also, the ATRAC system adopted in the present invention enables the reproduction of an audio having a high quality with a small number of bits (or bytes), and therefore it can be applied effectively also to a movie film restricted in space.

Further, according to the movie film of the present invention, it is possible to provide an audio signal having a high reliability and good reproduction quality without requiring a great modification in the already existing apparatus.

Many widely different embodiments of the present invention may be constructed without departing from the spirit and scope of the present invention, and it should be understood that the present invention is not restricted to the specific embodiments described above.

What is claimed is:

1. A movie film for recording image reproduction data and audio reproduction data, said movie film comprising:
a frame image information recording area arranged along a longitudinal direction in the form of frames; and
at least two digital audio data recording areas arranged at different positions in a direction orthogonal to the longitudinal direction, wherein said audio reproduction data is recorded in a digital format with a predetermined relationship in one of said at least two digital audio data recording areas and the same audio reproduction data is recorded in the same digital format in another of said at least two digital audio data recording areas, wherein said audio reproduction data recorded in said digital audio data recording areas is constituted by a plurality of channels and each channel includes a parameter by which said audio reproduction data is encoded, the encoded data, and a doubly written parameter the same as said parameter, wherein said doubly written parameter is recorded in a digital audio data recording area which is different from the digital audio data recording area in which said parameter and said encoded data are recorded.

2. A movie film as set forth in claim 1, wherein when the number of the channels is an even number, said doubly written parameter is recorded at a recording position of another digital audio data recording area corresponding to the recording position of the one digital audio data recording area in which said parameter and said encoded data are recorded.

3. A movie film as set forth in claim 1, wherein when the number of the channels is an odd number, said doubly written parameter is recorded in another digital audio data recording area in a unit of two cycles.

4. A method of recording audio reproduction data onto a movie film, said audio reproduction data comprising a plurality of channels, said movie film comprising a frame image information recording area in the form of frames arranged along a longitudinal direction of said movie film, and at least two digital audio data recording areas arranged at different positions in a direction orthogonal to the longitudinal direction, said method comprising the steps of:

encoding said audio reproduction data in accordance with a predetermined relationship in said at least two digital audio data recording areas, said encoding being performed by breaking down said audio reproduction data on a two-dimensional region of time and frequency into components of different types, analyzing the types of components that constitute said reproduction data, determining a plurality of encoding parameters corresponding to said plurality of channels, normalizing and requantifying the components of said audio reproduction data for each two-dimensional sub-region of time and frequency on the basis of said encoding parameter, recording said audio reproduction data in said digital audio data recording areas, and recording each of said encoding parameters twice in different digital audio recording areas.

* * * * *